David S. Wilhoit.
118088     *Garden-Implement.*
PATENTED AUG 15 1871
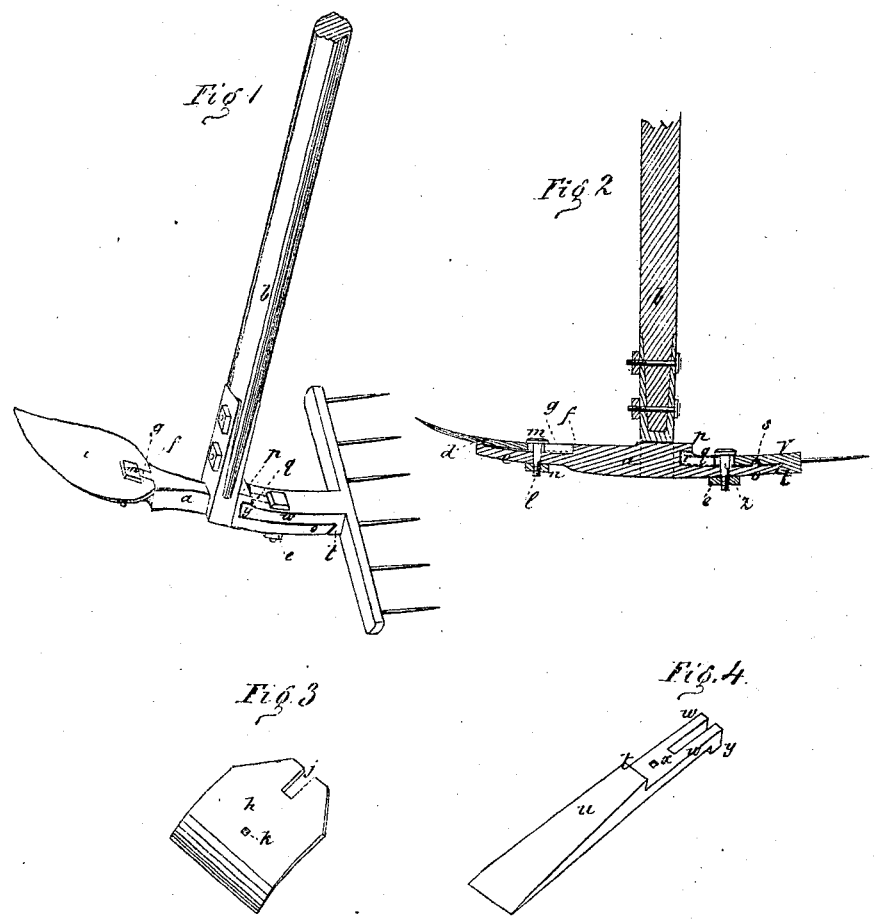
Witnesses:
Inventor:
David S. Wilhoit.
Per
Attorneys.

UNITED STATES PATENT OFFICE.

DAVID S. WILHOIT, OF MADISON COURT HOUSE, VIRGINIA.

IMPROVEMENT IN GARDEN IMPLEMENTS.

Specification forming part of Letters Patent No. 118,088, dated August 15, 1871.

*To all whom it may concern:*

Be it known that I, DAVID S. WILHOIT, of Madison Court House, in the county of Madison and State of Virginia, have invented a new and Improved Garden Implement; and I do hereby declare the following to be a full, clear, and exact description of the same, reference being had to the accompanying drawing making a part of this specification, in which—

Figure 1 is a perspective view; Fig. 2, a longitudinal sectional elevation; Fig. 3, a perspective view of the hoe; and Fig. 4 is a perspective view of the cutter.

My invention is an improvement in the class of hand garden implements distinguished by a metal head secured to a suitable stock or handle, and provided with two radial arms, constructed in such manner as to adapt them for ready attachment and detachment of blades, forks, &c., of various kinds. An example of this construction is seen in the patent of H. Miller, issued December 7, 1869. My object is to render the attachment of the various supplementary devices to the head more firm and secure, and thus capable of enduring more severe usage without becoming loose, &c., while the weight and cost of the implement as a whole shall not be materially, if at all, increased. To this end I construct the implement as follows:

Referring to the drawing, $a$ is the stock aforesaid, the same being a metallic bar secured in any sufficient manner to the end of the handle $b$. The stock $a$ is made with a plate, $c$, extending from one end, said plate coming to a point at its outer extremity and being armed with a pin, $d$, projecting upward from said point. At the inner end of the plate $c$ is a shoulder, $f$, between it and the stock $a$, and from the shoulder $f$ a tongue, $g$, extends for a short distance midway of the upper side of the plate $c$, to which said tongue is attached. The shoulder $f$ forms a stop for the inner end of the hoe $h$ or plow $i$ when attached to the stock. The tongue $g$ projects into a recess, $j$, in said hoe, and the pin $d$ extends into a hole, $k$, in the hoe. By means of these devices and a bolt, $l$, passed through the recess $j$ and through a hole in the plate $c$, and having a head, $m$, that is drawn down upon the hoe through the agency of a nut, $n$, on the bolt $l$, the hoe or plow is attached firmly to the stock $a$. It may readily be detached by loosening the nut $a$. From the other end of the stock $a$ a plate, $o$, projects, at the inner end of which is a shoulder, $p$, from which a tongue, $q$, extends for a short distance midway of the upper side of the plate $o$. At each side of the tongue $q$ a recess, $r$, is made in the end of the stock. The outer extremity of the plate $o$ is beveled, and from its upper side projects a pin, $s$. The beveled end of the plate $o$ meets a beveled shoulder, $t$, formed across the under side of the cutter $u$ or the rake-handle $v$. The prongs $w$ of the cutter pass to each side of the tongue $q$, the pin $s$ enters a hole, $x$, in the cutter, and the enlarged ends $y$ of the prongs $w$ fill the recesses $r$. By means of these devices and a headed bolt, $z$, and nut $e$ the cutter is readily attached to the stock; and, as in the case of the hoe, the cutter is readily detached by loosening the nut $e$.

Having thus described my invention, what I claim as new, and desire to secure by Letters Patent, is—

The construction of stock $a$ with plate $c$ having pin $d$, shoulder $f$, and tongue $g$ thereon, and with plate $o$ having shoulder $p$, tongue $q$, recess $e$, pin $s$, and shoulder $t$ thereon, so as to enable the tools specified to be fastened thereto in the manner set forth.

DAVID S. WILHOIT.

Witnesses:
 JNO. W. TAYLOR,
 H. W. GORDON.